J. RUDDIMAN.
GAS CLEANER.
APPLICATION FILED OCT. 16, 1908.
919,249.
Patented Apr. 20, 1909.
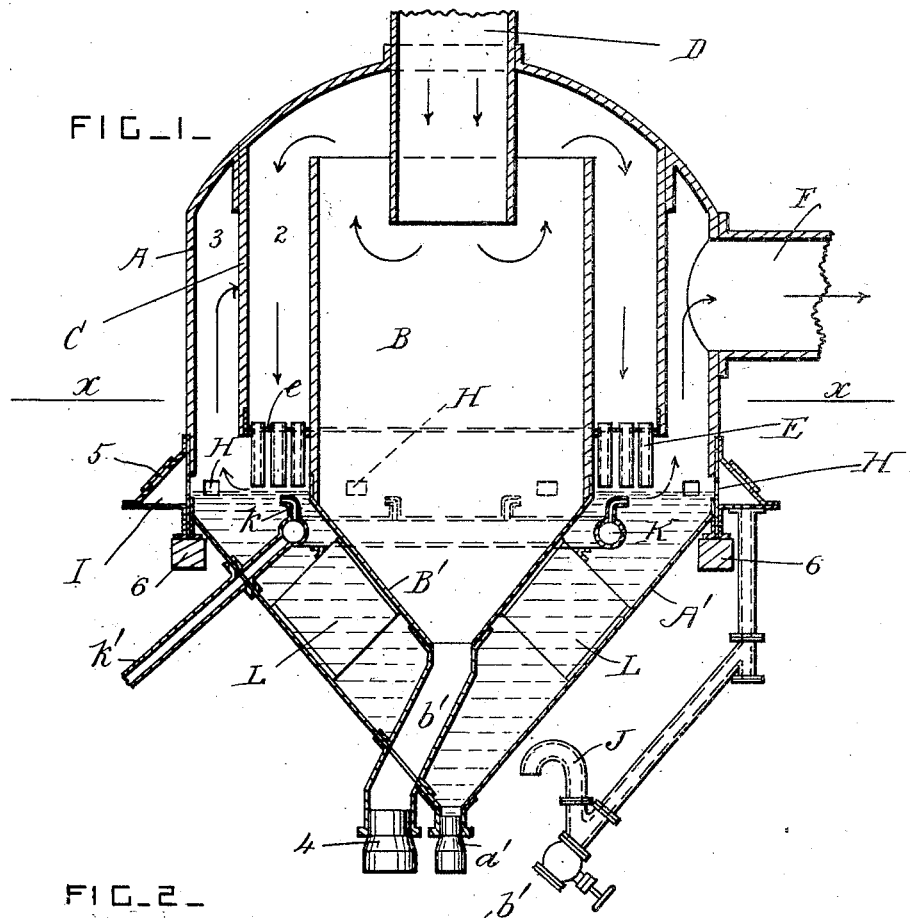
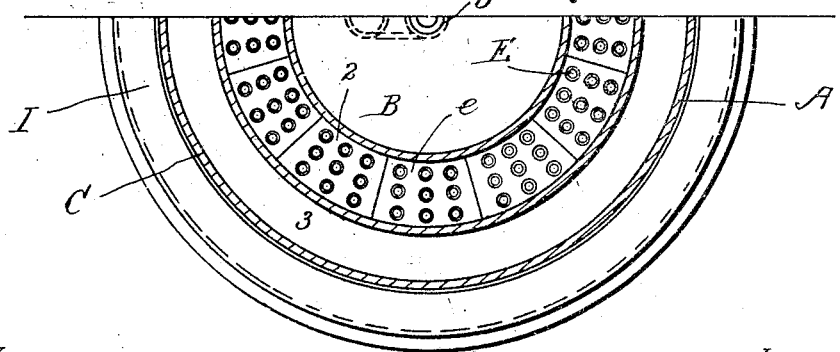
WITNESSES:
INVENTOR
John Ruddiman
BY
Attorney

UNITED STATES PATENT OFFICE.

JOHN RUDDIMAN, OF YONKERS, NEW YORK.

GAS-CLEANER.

No. 919,249.

Specification of Letters Patent.

Patented April 20, 1909.

Application filed October 16, 1908. Serial No. 458,083.

*To all whom it may concern:*

Be it known that I, JOHN RUDDIMAN, a citizen of the United States, residing at Yonkers, in the county of Westchester and State of New York, have invented certain new and useful Improvements in Gas-Cleaners; and I do hereby declare the following to be a full, clear, and exact description of the invention, such as will enable others skilled in the art to which it appertains to make and use the same.

This invention relates to gas cleaners used in connection with blast-furnaces; and it consists in the novel construction and combination of the parts hereinafter fully described and claimed, whereby the gas is cleaned by a dry process and by a wet process within a single cleaning apparatus.

In the drawings, Figure 1 is a vertical section through the gas-cleaner. Fig. 2 is a partial plan view, taken in section on the line $x-x$ in Fig. 1.

A is the external vessel of the apparatus provided with a gas outlet pipe F on one side.

D is an inlet pipe for the gas which projects downwardly from the top of the vessel A. The pipe D is connected direct to the down-comer pipe of the blast furnace, and the pipe F is connected to the boilers or stoves. The lower part A' of the vessel A forms a chamber for holding water, and is conical in form. Any approved form of valve or closure $a'$ is provided at the bottom of the chamber A' for letting out the mud periodically.

B is a dust chamber supported in the vessel A in any approved manner, and provided with a conical lower portion B' which depends within the water in the vessel A'.

L are brackets arranged between the chambers A' and B', and which support the chamber B'.

C is a cylinder which depends from the top of the vessel A around the dust chamber B, and which forms two annular chambers 2 and 3. Plates $e$ are supported horizontally at the bottom of the inner annular chamber 2, above the level of the water in the chamber A', and E are pipes which depend from the plates $e$ so that their lower ends are near the surface of the water. These pipes E are similar to those shown in the patent to B. J. Mullen, No. 782,041, and they divide up the gas into small volumes in a similar manner, but any other approved means can be used for causing the gas to impinge on the surface of the water contained in the vessel A'. The bottom of the pipe D projects into the dust chamber B, and the top of the dust chamber B is arranged below the top of the vessel A. The gas passes into the chamber B, and thence upward over the top of the chamber B into the chamber 2, as shown by the curved arrows. The lower part B' of the dust chamber is provided with an outlet pipe $b'$ having an outlet-valve 4 of any approved construction. The outlet-pipe $b'$ discharges the dust through the bottom of the chamber A' to one side of the mud-valve.

H are scum-outlets at the periphery of the vessel A which maintain the normal level of the water in the lower part of the said vessel a little below the bottoms of the pipes E.

I is an annular scum-chamber which encircles the chamber A over the outlets H, and which is provided with suitable hand-holes 5.

J is a water-seal and outlet-pipe connected to the scum-chamber I and maintaining the water in it at a lower level than that of the water in the chamber A'.

K is an annular water supply-pipe which encircles the chamber B', and which is provided with a series of jet-pipes $k$ arranged below the level of the water and pointing radially toward the scum-outlets H. The pipe K is supplied with water from a main pipe $k'$. Beams 6 are provided for supporting the entire apparatus.

In working a blast-furnace arches sometimes form inside it, and when these arches break down large quantities of solid coarse material and fine dust are discharged with the gas in a few seconds. Most of this solid material is caught by the dust chamber so that the washer does not become clogged up. The large particles of dust and solid matter are separated from the gas by gravity in the chamber B, and fall upon the conical bottom B' which is kept cool by being immersed in water. The dry accumulations in the chamber B are removed as often as desired by opening the valve 4. The gas with the lighter particles of dust passes into the annular chamber 2, in the direction of the arrows, and is discharged against the surface of the water through the pipes E at a greatly reduced velocity from that at which it entered the apparatus. The clean gas passes between the tubes E into the outer annular chamber 3, and is discharged through the outlet-pipe F. The gas moves the scum on the surface of the water toward the outlets H, with the assistance of the streams of water from the radial jet-pipes; and the scum which enters the chamber I is carried off with the overflow by the outlet pipe J continuously.

What I claim is:

1. In a gas cleaner, the combination, with an outer vessel for holding cooling water, of a gas chamber inclosed in the said vessel and having an open top and a conical bottom portion which is arranged in the water-space of the said vessel and provided at its apex with an outlet for solid matter, a gas inlet pipe connected to the top of the said outer vessel and arranged to discharge the gas and solid matter against the conical bottom portion of the gas chamber, and an outlet pipe for clean gas connected to the said outer vessel at a point below the level of the top of the gas chamber.

2. In a gas cleaner, the combination, with an outer vessel for holding cooling water, of a gas chamber inclosed in the said vessel with its lower part arranged in the water-space thereof and provided with a dust-outlet, the gas spaces of the said vessel and chamber being connected at their upper ends, a gas-inlet pipe connected to the top of the said outer vessel and delivering into the upper part of the said gas chamber, and means for causing the gas to impinge on the water in the said outer vessel in the space between it and the said gas chamber.

3. In a gas cleaner, the combination, with an outer vessel for holding cooling water, of a gas chamber inclosed in the said vessel and having its lower part arranged in the water space thereof and provided with a dust-outlet, a cylinder depending from the upper part of the said outer vessel and forming two annular gas spaces which are connected at their lower ends above the said water-space, and a gas-inlet pipe which delivers into the upper part of the said gas chamber.

4. In a gas cleaner, the combination, with a gas-inlet pipe or blast-furnace downcomer, of a gas chamber having its upper end portion arranged above and around the bottom end of the said pipe and having a dust outlet at its lower part, an outer vessel for holding cooling water which vessel incloses the said gas chamber and the lower end portion of the said pipe, said vessel being provided with an outlet for clean gas and a mud outlet, and a cylinder depending from the upper part of the said vessel and forming two annular gas passages, the inner annular passage communicating with the upper part of the said chamber at the top of the said cylinder, and the outer annular passage communicating with the said gas outlet and also with the inner annular passage at the bottom of the said cylinder above the water space of the said vessel.

5. In a gas-cleaner, the combination, with an outer vessel for holding water provided with a conical lower part having a mud-outlet, said vessel having also an outlet for clean gas, of a receiving chamber for the gas having a conical lower part arranged in the water-space of the said vessel and provided with a dust-outlet, a series of supports arranged between the conical lower parts of the said vessel and chamber, and means for causing the gas to impinge on the water in the said vessel.

6. In a gas-cleaner, the combination, with an outer vessel for holding water provided with a mud-outlet and an outlet for clean gas, said vessel having also a series of scum-outlets at its normal water-level, of a receiving chamber for the gas having its lower part arranged in the water-space of the said vessel and provided with a dust-outlet, a water supply-pipe having a series of nozzles arranged around the said chamber and delivering streams of water toward the said scum-outlets, and means for causing the gas to impinge on the water in the said vessel.

7. In a gas-cleaner, the combination, with an outer vessel for holding water provided with a mud-outlet and an outlet for clean gas, of a receiving chamber for the gas having its lower part arranged in the water-space of the said vessel and provided with a dust-outlet, a cylinder depending from the upper part of the said vessel and overlapping the said gas-outlet, plates supported between the lower part of the said cylinder and the said chamber, and a series of pipes carried by the said plates and operating to cause the gas to impinge on the surface of the water in the said vessel.

In testimony whereof I have affixed my signature in the presence of two witnesses.

JOHN RUDDIMAN.

Witnesses:
JOHN F. SHEPHERD,
CHAS. R. BENSON.